US009707531B2

(12) United States Patent
DiGiovanni et al.

(10) Patent No.: US 9,707,531 B2
(45) Date of Patent: Jul. 18, 2017

(54) COMBINED FIELD ASSISTED SINTERING TECHNIQUES AND HTHP SINTERING TECHNIQUES FOR FORMING POLYCRYSTALLINE DIAMOND COMPACTS AND EARTH-BORING TOOLS

(71) Applicant: Baker Hughes Incorporated, Houston, TX (US)

(72) Inventors: Anthony A. DiGiovanni, Houston, TX (US); Danny E. Scott, Montgomery, TX (US); Yavuz Kadioglu, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 14/837,747

(22) Filed: Aug. 27, 2015

(65) Prior Publication Data
US 2015/0367310 A1    Dec. 24, 2015

Related U.S. Application Data

(62) Division of application No. 13/647,843, filed on Oct. 9, 2012, now Pat. No. 9,149,777.
(Continued)

(51) Int. Cl.
*B29C 67/04* (2006.01)
*B01J 3/06* (2006.01)
(Continued)

(52) U.S. Cl.
CPC .............. *B01J 3/067* (2013.01); *B01J 3/062* (2013.01); *B24D 3/14* (2013.01); *B24D 18/0009* (2013.01);
(Continued)

(58) Field of Classification Search
CPC ......... B01J 3/067; B22F 3/10; B22F 2998/00; B29C 67/04
See application file for complete search history.

(56) References Cited

U.S. PATENT DOCUMENTS 1,071,488 A    8/1913    Weintraub et al.
4,171,973 A    10/1979   Hara et al.
(Continued)

FOREIGN PATENT DOCUMENTS

WO    2010045257 A1    4/2010
WO    2010046863 A1    4/2010

OTHER PUBLICATIONS

DiGiovanni et al., U.S. Appl. No. 61/232,265, entitled Polycrystalline Compacts Including In Situ Nucleated Grains, Earth Boring Tools Including Such Compacts, and Methods of Forming Such Compacts and Tools, filed Aug. 7, 2009.
(Continued)

*Primary Examiner* — Alison L Hindenlang
*Assistant Examiner* — Cedrick Williams
(74) *Attorney, Agent, or Firm* — TraskBritt

(57) ABSTRACT

Methods of forming polycrystalline diamond compacts include employing field assisted sintering techniques with high temperature and high pressure sintering techniques. For example, a particle mixture that includes diamond particles may be sintered by subjecting the particle mixture to a high temperature and high pressure sintering cycle, and pulsing direct electrical current through the particle mixture during at least a portion of the high temperature and high pressure sintering cycle. The polycrystalline diamond compacts may be used to form cutting elements for earth-boring tools. Sintering systems are configured to perform such sintering processes.

20 Claims, 6 Drawing Sheets

Related U.S. Application Data

(60) Provisional application No. 61/545,472, filed on Oct. 10, 2011.

(51) Int. Cl.
    *B24D 3/14*           (2006.01)
    *B24D 18/00*         (2006.01)
    *B24D 99/00*         (2010.01)
    *B82Y 30/00*         (2011.01)

(52) U.S. Cl.
    CPC .......... *B24D 99/005* (2013.01); *B29C 67/04* (2013.01); *B82Y 30/00* (2013.01)

(56) References Cited

U.S. PATENT DOCUMENTS

| | | | |
|---|---|---|---|
| 5,512,235 A * | 4/1996 | Cerutti | B01J 3/062 419/10 |
| 7,241,434 B2 | 7/2007 | Anthony et al. | |
| 7,516,804 B2 * | 4/2009 | Vail | E21B 10/567 175/420.2 |
| 7,976,596 B2 | 7/2011 | Egan et al. | |
| 8,349,040 B2 | 1/2013 | Bellin | |
| 8,617,274 B2 | 12/2013 | Zhan et al. | |
| 2001/0031237 A1 * | 10/2001 | Vagarali | B01J 3/062 423/446 |
| 2008/0168718 A1 | 7/2008 | Egan et al. | |
| 2008/0209818 A1 | 9/2008 | Belnap et al. | |
| 2011/0031034 A1 | 2/2011 | DiGiovanni et al. | |
| 2011/0061942 A1 | 3/2011 | DiGiovanni | |
| 2013/0086847 A1 | 4/2013 | DiGiovanni et al. | |

OTHER PUBLICATIONS

Merriam-Webster, Definition of "Allotrope", (2014), 2 pages.
Zhang et al., Spark Plasma Sintering Assisted Carbon Conversion from Various Modifications to Diamond, Materials Science and Technology 2010, Novel Sintering Processes and News in Traditional Sintering and Grain Growth: Applications, Theory, and Nanoscale Challenges, pp. 2312-2317 (2010).

\* cited by examiner

COMBINED FIELD ASSISTED SINTERING TECHNIQUES AND HTHP SINTERING TECHNIQUES FOR FORMING POLYCRYSTALLINE DIAMOND COMPACTS AND EARTH-BORING TOOLS

CROSS-REFERENCE TO RELATED APPLICATIONS

This application is a divisional of U.S. patent application Ser. No. 13/647,843, filed Oct. 9, 2012, now U.S. Pat. No. 9,149,777, issued Oct. 6, 2015, which claims the benefit of U.S. Provisional Patent Application Ser. No. 61/545,472, filed Oct. 10, 2011, the disclosure of each of which are hereby incorporated herein in their entirety by this reference.

TECHNICAL FIELD

Embodiments of the present disclosure relate generally to methods of forming polycrystalline diamond material, cutting elements including polycrystalline diamond material, and earth-boring tools for drilling subterranean formations including such cutting elements. More particularly, embodiments of the present disclosure relate to method of sintering material including diamond nanoparticles to form polycrystalline diamond compacts, and to compacts, cutting elements, and earth-boring tools including such sintered material.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as, for example, cobalt, iron, nickel, or alloys and mixtures thereof) to form a layer of polycrystalline diamond material on a cutting element substrate. These processes are often referred to as high temperature/high pressure (or "HTHP") processes. The cutting element substrate may comprise a cermet material (i.e., a ceramic-metal composite material) such as, for example, cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HTHP process.

Upon formation of a diamond table using an HTHP process, catalyst material may remain in interstitial spaces between the grains or crystals of diamond in the resulting polycrystalline diamond table. The presence of the catalyst material in the diamond table may contribute to thermal damage in the diamond table when the cutting element is heated during use due to friction at the contact point between the cutting element and the formation. Polycrystalline diamond cutting elements in which the catalyst material remains in the diamond table are generally thermally stable up to a temperature of about 750° Celsius, although internal stress within the polycrystalline diamond table may begin to develop at temperatures exceeding about 350° Celsius. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° Celsius and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within the diamond table, eventually leading to deterioration of the diamond table and ineffectiveness of the cutting element.

In order to reduce the problems associated with different rates of thermal expansion in polycrystalline diamond cutting elements, so-called "thermally stable" polycrystalline diamond (TSD) cutting elements have been developed. Such a thermally stable polycrystalline diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1,200° Celsius. It has also been reported, however, that such fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments, the present disclosure includes methods of forming polycrystalline diamond compacts. A particle mixture may be formed that includes diamond particles and nanoparticles, and sintering the particle mixture to form polycrystalline diamond material including nanograins of diamond. Sintering the particle mixture includes subjecting the particle mixture to a high temperature and high pressure sintering cycle, and applying electrical current through the particle mixture during at least a portion of the high temperature and high pressure sintering cycle. For example, direct electrical current may be pulsed through the particle mixture.

In additional embodiments, the present disclosure includes methods of forming earth-boring tools. A particle mixture may be formed that includes diamond particles and nanoparticles, and the particle mixture is sintered to form a polycrystalline diamond compact that includes nanograins of diamond. Sintering the particle mixture includes subjecting the particle mixture to a high temperature and high pressure sintering cycle, and applying electrical current (e.g., pulsing direct electrical current) through the particle mixture during at least a portion of the high temperature and high pressure sintering cycle. The polycrystalline diamond compact then may be attached to a body of an earth-boring tool.

In yet further embodiments, the present disclosure includes sintering systems for use in sintering a particle mixture to form a polycrystalline diamond compact. The systems may be configured to allow a particle mixture to be subjected to both high temperature and high pressure conditions as part of an HTHP sintering cycle, as well as to allow the particle mixture to be subjected to a field assisted sintering process during at least a portion of the HTHP sintering cycle. For example, the sintering systems may include a pressure cell, at least one device configured to increase a pressure within the pressure cell to at least about 5.0 GPa, and at least one heating device configured to increase a temperature within the pressure cell to at least about 1,300° C. The sintering systems may further include an electrically conductive pathway that includes a first segment extending to a first side of the pressure cell and a second segment extending to a second side of the pressure cell. The first segment and the second segment of the electrically conductive pathway are configured to provide electrical current through a container and a particle mixture to be compacted within the pressure cell during a sintering cycle such that electrical current may be conducted through the particle mixture using the electrically conductive pathway during at least a portion of the sintering cycle.

DETAILED DESCRIPTION

Figure 1A:
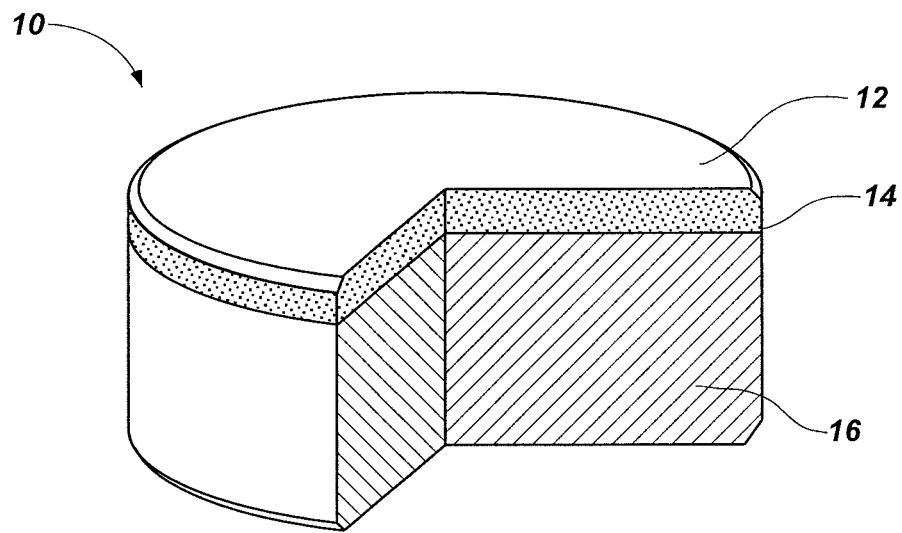
FIG. 1A is a partial cut-away perspective view illustrating an embodiment of a cutting element comprising a polycrystalline diamond compact of the present disclosure.

The illustrations presented herein are not meant to be actual views of any particular material, polycrystalline diamond compact, cutting element, or earth-boring tool, but are merely idealized representations which are employed to describe certain embodiments of the present disclosure. For clarity in description, various features and elements common among the embodiments of the disclosure may be referenced with the same or similar reference numerals.

As used herein, the term "particle" means and includes any coherent volume of solid matter having an average dimension of about 2 mm or less. Grains (i.e., crystals) and coated grains are types of particles. As used herein, the term "nanoparticle" means and includes any particle having an average particle diameter of about 500 nm or less. Nanoparticles include grains in a polycrystalline material having an average grain size of about 500 nm or less. Such nanoparticles are also referred to herein as "nanograins."

As used herein, the term "polycrystalline diamond" means and includes diamond material comprising a plurality of diamond grains or crystals that are bonded directly together by intergranular diamond-to-diamond bonds. The crystal structures of the individual diamond grains may be randomly oriented in space within the polycrystalline diamond.

As used herein, the term "polycrystalline diamond compact" means and includes any structure comprising polycrystalline diamond formed by a process that involves application of pressure (e.g., compaction) to the precursor material or materials used to form the polycrystalline diamond.

As used herein, the term "intergranular bond" means and includes any direct atomic bond (e.g., covalent, ionic, etc.) between atoms in adjacent grains of material.

As used herein, the term "catalyst material" refers to any material that is capable of catalyzing the formation of intergranular bonds between grains of material during a sintering process (e.g., an HTHP process). For example, catalyst materials for diamond include, but are not limited to, cobalt, iron, nickel, other elements from Group VIIIA of the periodic table of the elements, and alloys thereof.

As discussed in further detail below, the present disclosure includes methods of forming polycrystalline diamond compacts using sintering processes that employ both high temperature and high temperature (HTHP) sintering conditions, as well as what is referred to in the art as the "field assisted sintering technique" (FAST). The field assisted sintering technique is also referred to in the art as "spark plasma sintering," or "pulsed electric current sintering" (PECS). Broadly, the methods include sintering a particle mixture by subjecting the particle mixture to HTHP conditions and pulsing electrical current through the particle mixture over at least a portion of the period of time during the HTHP sintering cycle. Embodiments of the present disclosure may find particular utility in the formation of polycrystalline diamond material that includes nanograins of diamond material, as the sintering process may result in an increased rate of formation of intergranular diamond-to-diamond bonds between the diamond grains during the sintering process, and, hence, the sintering process may result in reduced grain growth of the nanograins and retention of relatively small grain size in the nanograins of diamond.

Polycrystalline diamond compacts formed in accordance with embodiments of the present disclosure may be used to form at least a portion of a cutting element. Such cutting elements may be mounted to bodies of earth-boring tools, such as earth-boring rotary drill bits, which may be used, for example, in the oil and gas industry to form wellbores, as well as in the mining industry.

FIG. 1A is a simplified, partially cut-away perspective view of an embodiment of a polycrystalline diamond compact (PDC) cutting element 10 of the present disclosure. The cutting element 10 comprises a polycrystalline diamond compact in the form of a layer of polycrystalline diamond 12, also known in the art as a diamond table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

Figure 1B:
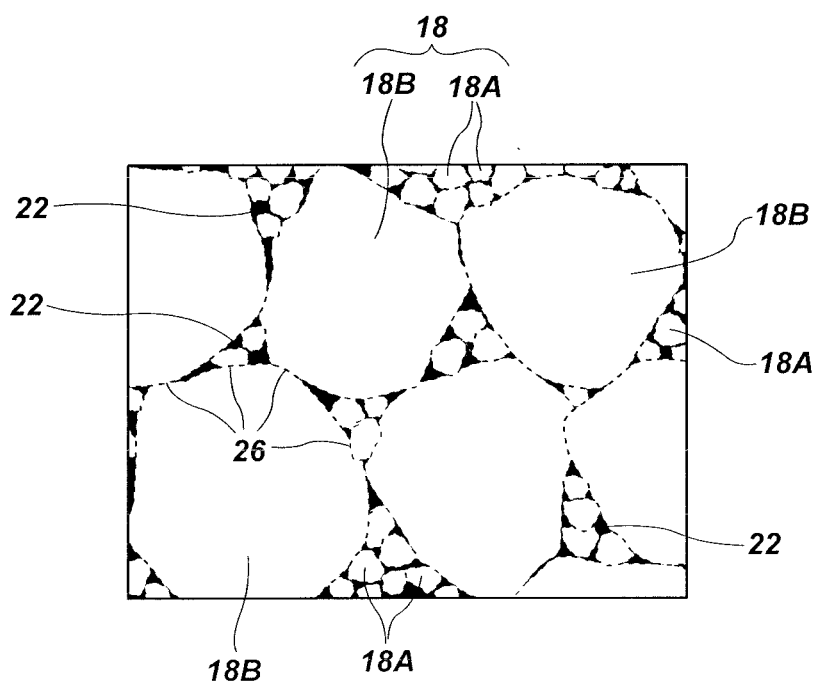
FIG. 1B is a simplified drawing showing how a microstructure of the polycrystalline diamond compact of FIG. 1A may appear under magnification, and illustrates nanograins of diamond and relatively larger diamond grains that are interspersed and inter-bonded with one another.

FIG. 1B is an enlarged view illustrating how a microstructure of the polycrystalline diamond 12 of the cutting element 10 may appear under magnification. The polycrystalline diamond 12 includes interbonded diamond grains 18. The diamond grains 18 optionally may have a multi-modal (e.g., bi-modal, tri-modal, etc.) grain size distribution. In some embodiments, the polycrystalline diamond 12 may comprise a multi-modal grain size distribution as disclosed in at least one of Provisional U.S. Patent Application Ser. No. 61/232,265, which was filed on Aug. 7, 2009, and entitled "Polycrystalline Compacts Including In-Situ Nucleated Grains, Earth-Boring Tools Including Such Compacts, And Methods Of Forming Such Compacts And Tools," and U.S. Patent Publication No. 2011/0061942 A1, published on Mar. 17, 2011 to DiGiovanni, the disclosures of each of which is incorporated herein in its entirety by this reference.

For example, the layer of hard polycrystalline diamond 12 may include a first plurality of diamond grains 18A having a first average grain size, and at least a second plurality of diamond grains 18B having a second average grain size that differs from the first average grain size of the first plurality of diamond grains 18A. The second plurality of diamond grains 18B may be larger than the first plurality of diamond grains 18A. For example, the average grain size of the larger diamond grains 18B may be at least about one hundred fifty (150) times greater than the average grain size of the smaller diamond grains 18A. In additional embodiments, the average grain size of the larger diamond grains 18B may be at least about five hundred (500) times greater than the average grain size of the smaller diamond grains 18A. In yet further embodiments, the average grain size of the larger diamond grains 18B may be at least about seven hundred fifty (750) times greater than the average grain size of the smaller diamond grains 18A. The smaller diamond grains 18A and the larger diamond grains 18B may be interspersed and interbonded to form the layer of hard polycrystalline diamond 12. In other words, in embodiments in which the polycrystalline diamond 12 comprises polycrystalline diamond, the smaller diamond grains 18A and the larger diamond grains 18B may be mixed together and bonded directly to one another by intergranular diamond-to-diamond bonds 26 (represented by dashed lines in FIG. 1B).

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline diamond 12 (e.g., a polished and etched surface of the polycrystalline diamond 12). Commercially available vision systems are often used with such microscopy systems, and these vision systems are capable of measuring the average grain size of grains within a microstructure. In some embodiments, the smaller diamond grains 18A may comprise nanograins of diamond.

By way of example and not limitation, in embodiments in which the average grain size of the smaller diamond grains 18A is between about one nanometer (1 nm) and about one hundred fifty nanometers (150 nm), the average grain size of the larger diamond grains 18B may be between about five microns (5 µm) and about forty microns (40 µm). Thus, in some embodiments, the ratio of the average grain size of the larger diamond grains 18B to the average grain size of the smaller diamond grains 18A may be between about 33:1 and about 40,000:1.

The large difference in the average grain size between the smaller diamond grains 18A and the larger diamond grains 18B may result in smaller interstitial spaces 22 or voids (represented as shaded areas in FIG. 1B) within the microstructure of the polycrystalline diamond 12, and the total volume of the interstitial spaces 22 or voids may be more evenly distributed throughout the microstructure of the polycrystalline diamond 12. As a result, any material present within the interstitial spaces 22 (e.g., a carbon compound or a catalyst material, as described below) may also be more evenly distributed throughout the microstructure of the polycrystalline diamond 12 within the relatively smaller interstitial spaces 22 therein.

In some embodiments, the number of smaller diamond grains 18A per unit volume of the polycrystalline diamond 12 may be higher than the number of larger diamond grains 18B per unit volume of the polycrystalline diamond 12.

The smaller diamond grains 18A may comprise between about one-half of one percent (0.5%) and about one hundred percent (100%) by volume of the polycrystalline diamond 12. In some embodiments, the smaller diamond grains 18A may comprise between about one-half of one percent (0.5%) and about fifty percent (50%) by volume of the polycrystalline diamond 12, or even between about one-half of one percent (0.5%) and about five percent (5%) by volume of the polycrystalline diamond 12. The remainder of the volume of the polycrystalline diamond 12 may be substantially comprised by the larger diamond grains 18B. A relatively small percentage of the remainder of the volume of the polycrystalline diamond 12 (e.g., less than about ten percent (10%)) may comprise interstitial spaces 22 between the smaller diamond grains 18 and the larger diamond grains 18.

In some embodiments, at least some of the smaller diamond grains 18A may comprise in-situ nucleated diamond grains, as disclosed in U.S. Patent Publication No. 2011/0031034 A1, published on Feb. 10, 2011 to DiGiovanni et al., the disclosure of which is incorporated herein in its entirety by this reference.

In additional embodiments, the diamond grains 18 may consist substantially entirely of nanograins of diamond, such as the smaller diamond grains 18A, and without any larger diamond grains 18B.

As previously mentioned, field assisted sintering techniques may be combined with HTHP sintering processes to form polycrystalline diamond compacts, and cutting elements including such polycrystalline diamond compacts, in accordance with the present disclosure. Example embodiments of such methods are disclosed below with reference to FIGS. 2 through 4.

Figure 2:
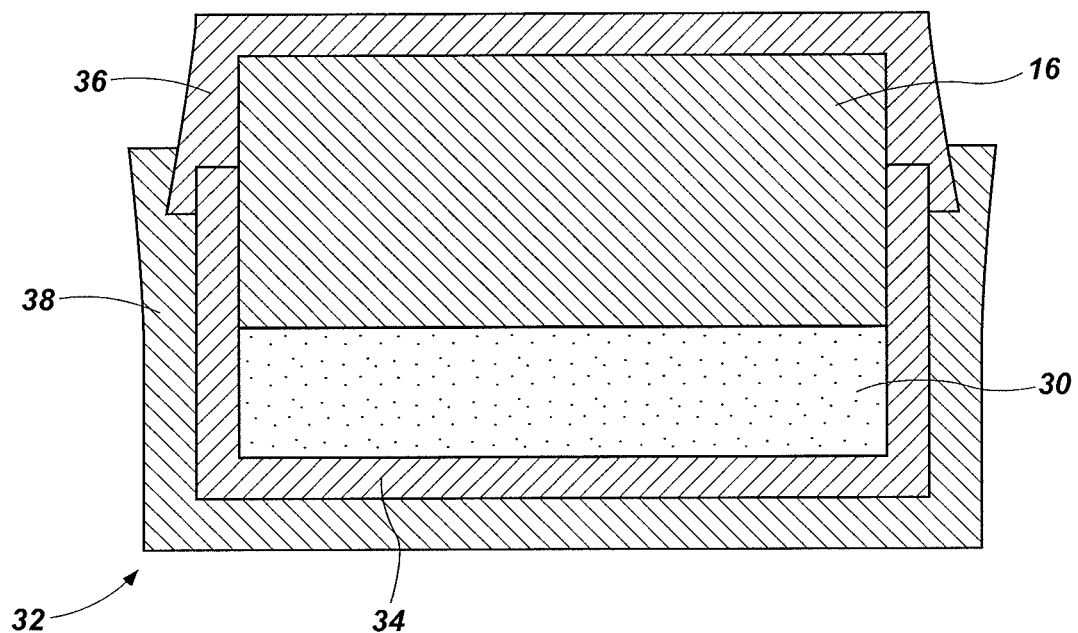
FIG. 2 is a cross-sectional view illustrating a particle mixture encapsulated in a container in preparation for sintering the particle mixture in accordance with embodiments of methods of the present disclosure.

Referring to FIG. 2, a particle mixture 30 may be formed. The particle mixture 30 includes diamond particles. At least some of the diamond particles may have an average particle size of at least about one micron (1 μm), in some embodiments. The diamond particles may be used to form at least some of the diamond grains 18, such as the larger diamond grains 18B, in the polycrystalline diamond 12 of FIG. 1B upon sintering the particle mixture 30.

The particle mixture 30 also may comprise nanoparticles. The nanoparticles also may be used to form at least some of the diamond grains 18, such as the smaller diamond grains 18A, in the polycrystalline diamond 12 of FIG. 1B upon sintering the particle mixture 30. The nanoparticles may include, for example, one or more of diamond nanoparticles and nanoparticles of a non-diamond carbon allotrope. Non-diamond carbon allotropes include graphite, amorphous carbon, carbon nanotubes, graphene, carbon fullerenes (e.g., $C_{60}$), etc. Such non-diamond carbon allotropes may be at least partially converted to diamond upon sintering the particle mixture 30. For example, in some embodiments in which the nanoparticles include nanoparticles of a non-diamond carbon allotrope such as carbon nanotubes, graphene, or carbon fullerenes, at least some of the nanoparticles of the non-diamond carbon allotrope may be converted into at least some nanograins of diamond in a polycrystalline material formed by sintering the particle mixture 30.

In embodiments in which the particle mixture 30 includes nanoparticles, the relatively larger diamond particles in the particle mixture 30 optionally may be coated with the nanoparticles. For example, in some embodiments, the relatively larger diamond particles may be coated with diamond nanoparticles and/or nanoparticles of a non-diamond carbon allotrope. In yet further embodiments, the nanoparticles may comprise diamond nanoparticles and nanoparticles of a non-diamond carbon allotrope, and the diamond nanoparticles may be coated with the nanoparticles of the non-diamond carbon allotrope.

In some embodiments, the particle mixture 30 also may comprise a catalyst mixture. For example, the particle mixture 30 may include particles of catalyst material. In other embodiments, however, catalyst material may not be present in the particle mixture 30, but may enter the particle mixture 30 during the sintering process from another structure (e.g., a cutting element substrate).

With continued reference to FIG. 2, the particle mixture 30 may be positioned within a canister 32. The particle mixture 30 includes the diamond nanoparticles and optional nanoparticles, which will ultimately form the diamond grains 18 in the polycrystalline diamond 12 (FIG. 1B). The canister 32 may include an inner cup 34 in which the particle mixture 30 may be disposed. If the cutting element 10 is to include a substrate 16 (FIG. 1A), the substrate 16 optionally may also be provided in the inner cup 34 over or under the particle mixture 30, and may ultimately be encapsulated in the canister 32. The canister 32 may further include a top end piece 36 and a bottom end piece 38, which may be assembled and bonded together (e.g., swage bonded) around the inner cup 34 with the particle mixture 30 and the optional substrate 16 therein. The sealed canister 32 then may be subjected to a sintering process as described herein to form the polycrystalline diamond 12.

It is known in the art to include mica films within the canister 32 to enable easy separation of the finished polycrystalline diamond 12 (and substrate 16) from the metal canister 32 after the sintering process. To ensure that an electrical pathway is provided through the canister 32 and through the particle mixture 30 for a FAST sintering process as described herein, if any such mica film is included, the mica film may have a reduced diameter relative to that of the inner surfaces of the canister 32, or may include holes or slits extending therethrough, to ensure that the mica film does not form an electrical barrier preventing the flow of current through the particle mixture 30. Such holes or slits optionally may be filled with conductive material, as an empty slit might result in stress concentrations in the polycrystalline diamond 12 during sintering.

In accordance with embodiments of the present disclosure, the particle mixture 30 may be sintered by subjecting the particle mixture 30 to an HTHP sintering cycle, and conducting electrical current through the particle mixture 30 during at least a portion of the HTHP sintering cycle. For example, direct electrical current may be pulsed through the particle mixture 30 during at least a portion of the HTHP sintering cycle. In some embodiments, electrical current may be pulsed through the particle mixture 30 during a portion of the HTHP sintering cycle prior to application of a maximum temperature or pressure in the cycle. In such embodiments, after the electrical current has been pulsed through the particle mixture 30 in the FAST sintering process at an intermediate temperature and pressure of the HTHP process, the maximum temperature and pressure of the HTHP process may be applied to the particle mixture 30. In such embodiments, some of the interbonded diamond grains in the microstructure produced by the FAST sintering process may be damaged by application of increased temperature and pressure in the subsequent portion of the full HTHP sintering cycle. However, it is to be appreciated that an HTHP sintering cycle may be properly adjusted to accommodate an intermediate FAST sintering process in a manner to retain some of the FAST-sintered microstructure in the final HTHP-sintered microstructure. Optionally, the HTHP sintering cycle may be conducted while the particle mixture 30 is in the presence of a catalyst material configured to catalyze the formation of diamond-to-diamond intergranular bonds in the resulting polycrystalline diamond 12, as previously mentioned.

Figure 3:
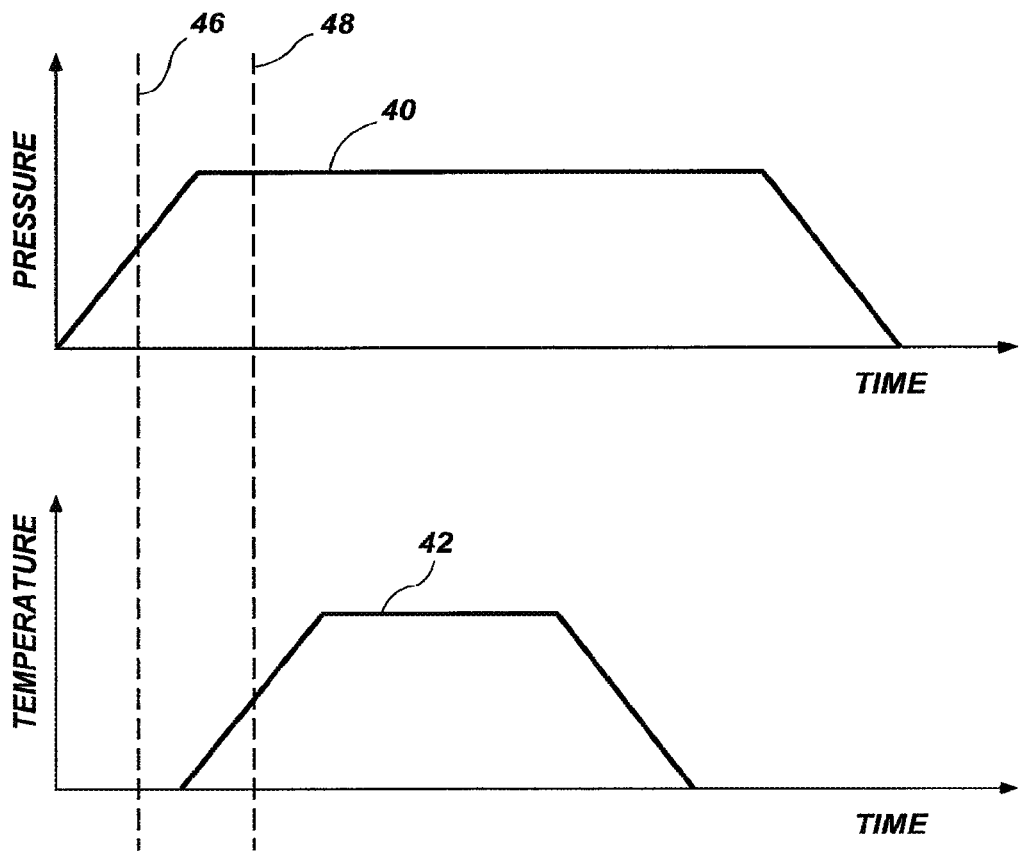
FIG. 3 is a schematically illustrated diagram showing a graph of pressure versus time and a graph of temperature versus time for an example high temperature and high pressure process to which the particle mixture shown in FIG. 2 may be subjected.

FIG. 3 includes two graphs schematically representing temperatures and pressures to which the particle mixture 30 may be subjected during an HTHP sintering cycle.

The graphs of FIG. 3 illustrate the temperature and pressure profiles of the conditions to which the canister 32 with the particle mixture 30 therein may be subjected in an HTHP sintering cycle. No particular temperature, pressure, or time values are specified in the graphs of FIG. 3, as the graphs are meant to depict relative conditions from one period of time to another. The graphs of FIG. 3 extend over a common hypothetical time period. In other words, the X axes in the graphs are assumed to extend over the same range of values and to have the same scale.

The HTHP sintering cycle may be carried out using known HTHP sintering presses including any of cubic presses, belt presses, and toroid presses.

As shown in FIG. 3, the sintering cycle may commence by ramping the pressure within the HTHP press up to a maximum sintering pressure. In some embodiments, the maximum sintering pressure may be between about 5.0 GPa and about 14 GPa. The temperature may also be ramped up to a maximum sintering temperature 42. In some embodiments, the maximum sintering temperature may be at least about 1,300° C. The canister 32 with the particle mixture 30 therein may be subjected to pressures of at least about 5.0 GPa and temperatures of at least about 1,300° C. for a time period extending from a few seconds to several minutes or more, although it may be desirable to reduce the sintering time period so as to hinder grain growth in the polycrystalline diamond 12. The temperature in the press may be ramped down from the maximum sintering temperature 42, and the pressure in the press may be ramped down from the maximum sintering pressure 40. In some embodiments, the ramping up of the temperature may start subsequent to commencing the ramping up of the pressure, and the ramping down of the temperature may start prior to commencing the ramping down of the pressure, as represented in FIG. 3. The HTHP sintering cycle represented in FIG. 3 is provided merely as an example of an HTHP sintering process, and HTHP sintering processes having other temperature and pressure profiles also may be employed in embodiments of the present disclosure.

As previously mentioned, electrical current may be conducted (e.g., pulsed) through the particle mixture 30 during at least a portion of the HTHP sintering cycle. For example, in some embodiments, electrical current may be conducted through the particle mixture 30 during the portion of the HTHP sintering cycle represented in FIG. 3 between the dashed line 46 and the dashed line 48. In such embodiments, by performing the FAST sintering near the beginning of the HTHP sintering cycle, partially bonded porous nano-clusters of diamond particles may be formed by the FAST sintering process, which may be relatively more stable during the remainder of the HTHP sintering cycle (e.g., prior to infiltration of catalyst material from the substrate 16). In additional embodiments, however, the FAST sintering process could be carried out in the middle of the HTHP sintering cycle with the powder mixture 30 is being subjected to the maximum sintering pressure 40 and the maximum sintering temperature 42, or the FAST sintering process could be carried out at the end of the HTHP sintering cycle after beginning to ramp down the temperature and/or the pressure in the HTHP sintering press. In yet further embodiments, the FAST sintering process could be carried out over the entire HTHP sintering cycle, over the beginning and middle portions but not an end portion of the HTHP sintering cycle, or over the middle and end portions but not the beginning portion of the HTHP sintering cycle. In other words, the dashed lines 46 and 48 representing the beginning and end, respectively of the FAST sintering process, may be positioned anywhere along the X axes of the graphs of FIG. 3, which represent the HTHP sintering cycle. It is to be appreciated that, during the sintering of diamond particles in the FAST sintering process, sintering occurs in the presence of diamond particles that are substantially free from catalyst material, binder material, or other electrically conductive materials that form a continuous pathway for electrical current, as such additional materials or configurations may "short out" or otherwise negate the effects of the FAST sintering process.

Figure 4:
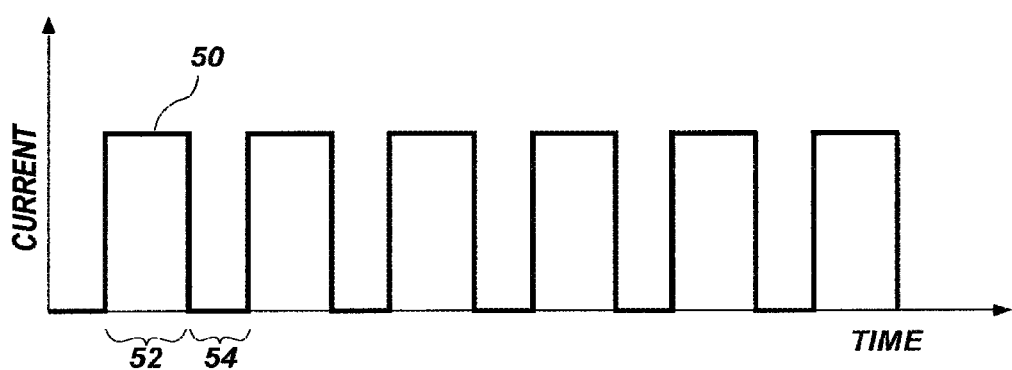
FIG. 4 is a schematically illustrated diagram showing a graph of amperage, as a function of time, that may be applied through the particle mixture shown in FIG. 2 during at least a portion of a high temperature and high pressure process to which the particle mixture may be subjected, such as that represented in FIG. 3.

The FAST sintering process may involve the application of pulsed electrical current through the particle mixture 30. FIG. 4 is a schematically illustrated graph of the current as a function of time over the time period between the dashed lines 46, 48 of FIG. 3. As shown in FIG. 4, a pulse current 50 may be applied through the particle mixture 30. The pulse current 50 may have an amperage of between about two hundred (200) amperes and about two thousand (2,000) amperes in some embodiments. Each electrical pulse may be applied for a pulse time 52 of between about five milliseconds (5 ms) and about twenty five milliseconds (25 ms) in some embodiments. The time intervals 54 between the electrical pulses during which no current may be applied may range from about one half of a millisecond (0.5 ms) to about one hundred milliseconds (100 ms) in some embodiments. Other pulse currents, pulse times, and interval times also may be employed in additional embodiments.

The use of the field assisted sintering techniques in combination with the HTHP sintering process may enable the sintering process to be carried out at HTHP conditions that would not adequately sinter the particle mixture 30 in the absence of the field assisted sintering. For example, referring again to FIG. 3, in some embodiments, the maximum pressure 40 of the HTHP pressure may be at least about 6.5 GPa, and the maximum temperature 42 of the HTHP temperature may be about 1,600° C. or less. Further, the total cycle time for the HTHP sintering cycle may be about 2.0 minutes or less in some such embodiments.

The electrical current which is pulsed through the particle mixture 30 may result in rapid resistive heating of the particle mixture 30, which may result in sintering of the diamond particles present in the particle mixture 30. To enable the pulsing of the electrical current through the particle mixture 30, a conductive pathway may be provided that extends through the particle mixture 30. This conductive pathway may be electrically insulated from any electrical heating elements external to the particle mixture 30 that are part of the HPHT press and used to heat the canister 32 and the particle mixture 30 therein during the HPHT sintering cycle.

Figure 5:
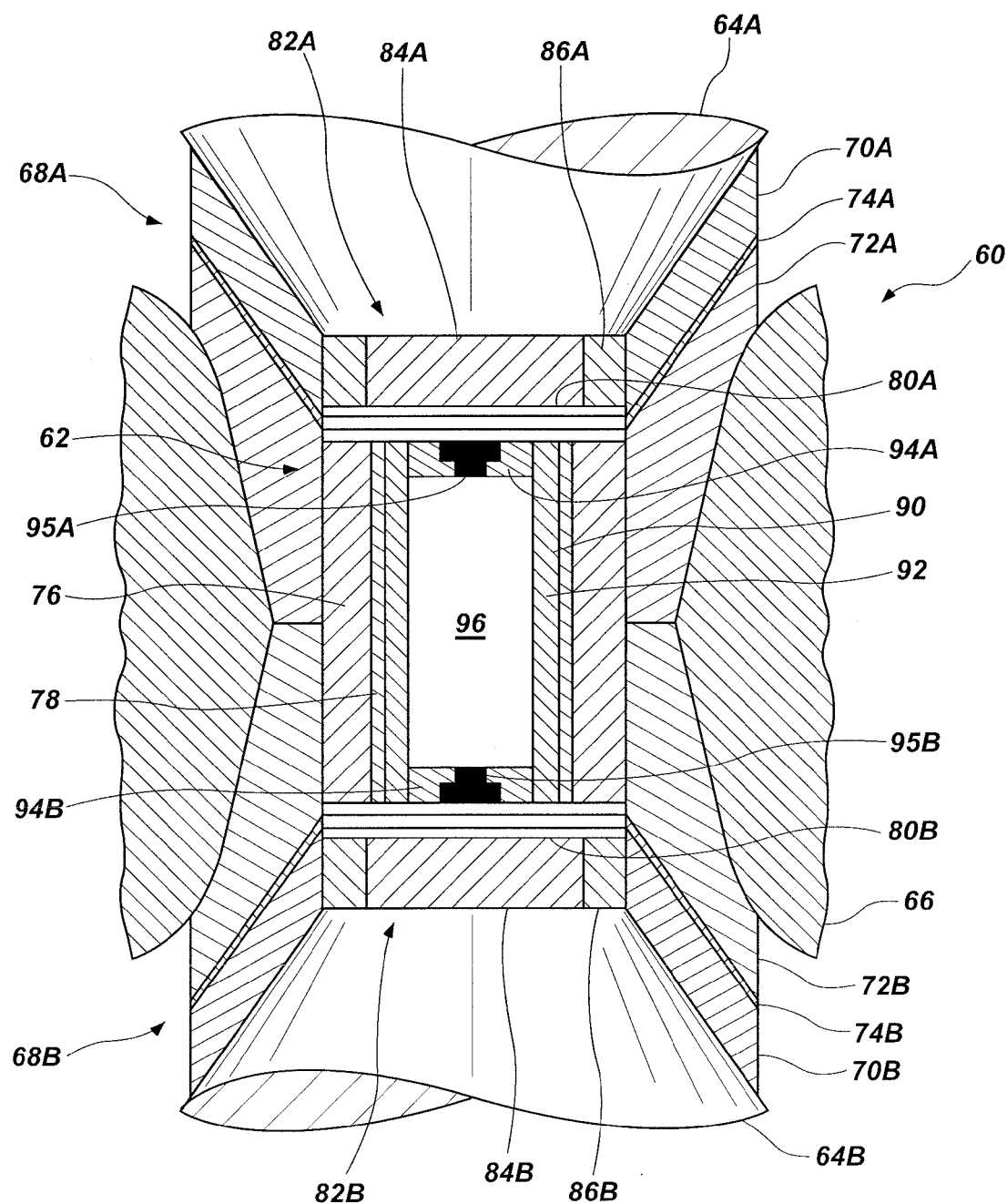
FIG. 5 is a schematically illustrated cross-sectional view of an embodiment of a pressure cell of an HPHT sintering system that may be employed in embodiments of the disclosure.

FIG. 5 is a schematically illustrated cross-sectional view of an embodiment of a pressure cell 60 of an HPHT sintering system that may be employed in embodiments of the disclosure.

The pressure cell 60 shown in FIG. 5 is of the belt-press type. The pressure cell 60 includes a generally cylindrical assembly 62 interposed between a pair of punches, 64A and 64B, and surrounded by a generally annular belt or die member 66. Preferably, both punches 64A, 64B and belt member 66 are formed of a relatively hard material, such as cemented tungsten carbide. Between punches 64A, 64B and belt member 66 are a pair of insulating assemblies, 68A and 68B, each of which is formed of a pair of thermally and electrically insulating members, 70A, 70B and 72A, 72B, each formed of pyrophyllite or the like, and having an intermediate, electrically conductive metallic gasket, 74A and 74B, disposed there between.

As shown, cylindrical assembly 62 includes a hollow salt cylinder 76, which may be formed of salt, talc, etc.

Positioned concentrically within the salt cylinder 76 is an adjacent cylindrical heater tube 78, which comprises a graphite electrical resistance heater tube for providing indirect heating to a center cavity 96, in which one or more canisters 32 like that of FIG. 2 may be disposed. Electrical connection with heater tube 78 is achieved through conductive disc structures 80A and 80B, which are disposed adjacent the heater tube 78 on opposing axial ends of the heater tube 78. The conductive disc structures 80A, 80B are described in further detail herein below with reference to FIGS. 6A-6C. With continued reference to FIG. 5, an end cap assembly 82A is provided adjacent the conductive disc structure 80A, and another end cap assembly 82B is provided adjacent the conductive disc structure 80B. Each of the end cap assemblies 82A, 82B comprises an insulating plug, 84A, 84B, respectively, surrounded by a respective electrically conductive ring 86A, 86B.

The interior of heater tube 78, along with the conductive disc structures 80A, 80B, the salt cylinder 76, and the end cap assemblies 82A, 82B, defines the center cavity 96. As shown in FIG. 5, a pressure transmitting medium 90 may be disposed within the cavity 96 (around the canisters 32 (FIG. 2) to be disposed therein). The pressure transmitting medium 90 may be selected to have a relatively low coefficient of internal friction to make it semi-fluid at the HTHP conditions. The pressure transmitting medium 90 may comprise a cylindrical salt liner 92 in some embodiments. A pair of salt rings 94A and 94B also may be disposed in the cavity 96 at the opposing axial ends thereof, as shown in FIG. 5. An electrically conductive graphite plug 95A may be disposed within the salt ring 94A, and another electrically conductive graphite plug 95B may be disposed within the salt ring 94B. Each of the salt rings 94A, 94B with the electrically conductive graphite plugs 95A, 95B therein, may define a pressure transmitting medium layer. The pressure transmitting medium 90 may be provided in solid or particulate form. In either case, medium 90 defines a cavity space, as is shown at 46, which is configured to receive the discolored diamond to be annealed.

The conductive disc structures 80A, 80B are described in further detail with reference to FIGS. 6A-6C. The conductive disc structures 80A, 80B are used to provide two, separate, conductive pathways therethrough that are electrically isolated from one another. One electrical pathway may extend to and through the heater tube 78 for providing the heat external the cavity 96 as part of the HTHP sintering process. The other electrical pathway may extend to and through the electrically conductive graphite plugs 95A, 95B, and through the canisters 32 (FIG. 2) and diamond particles therein disposed in the cavity 96.

Figure 6A:
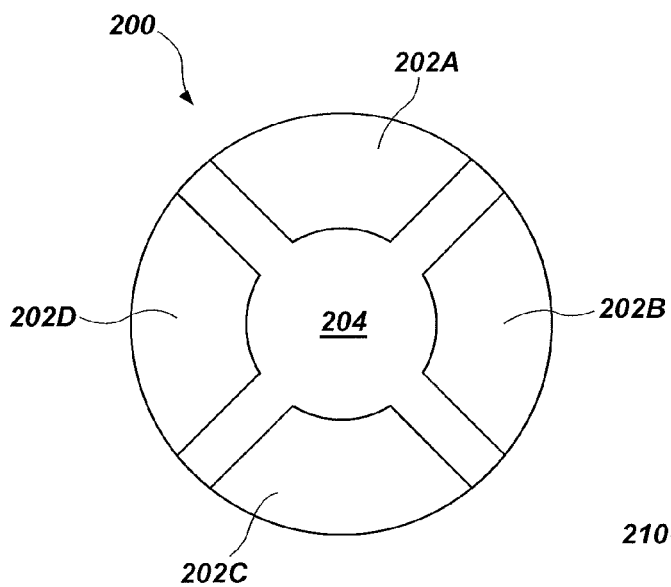
FIGS. 6A-6C are plan views of an electrically conductive element of the pressure cell shown in FIG. 5.
Figure 6B:
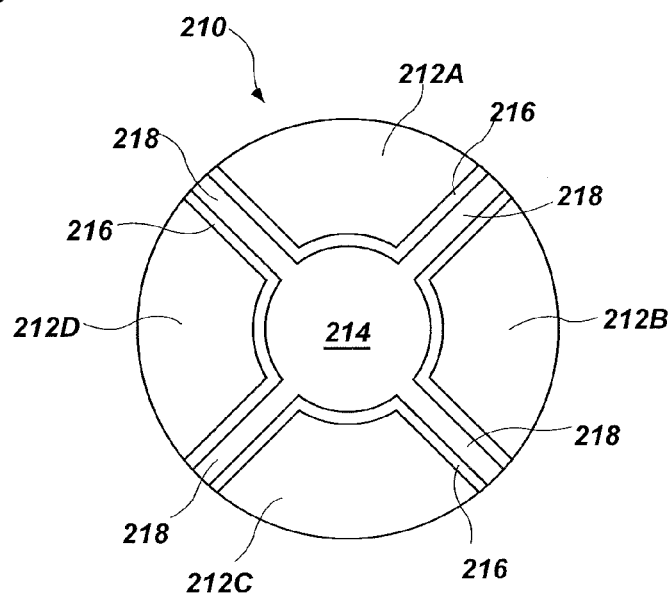
Figure 6C:
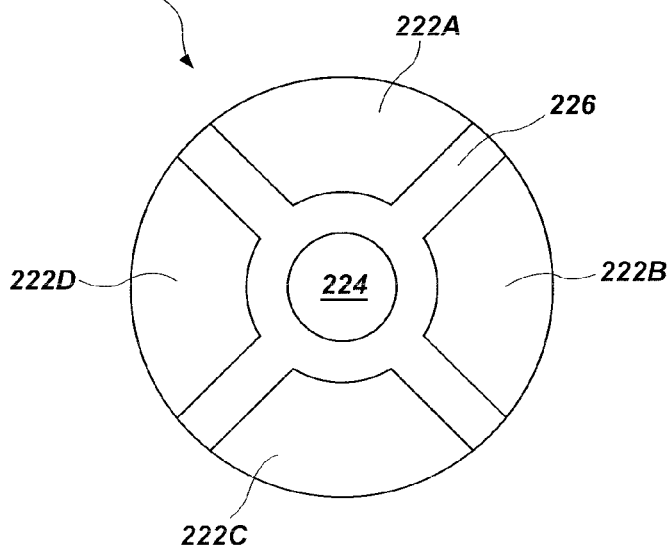

As an example embodiment, each conductive disc structure 80A, 80B may include a stack of three discs, which includes a first disc 200 shown in FIG. 6A, a second disc 210 shown in FIG. 6B, and a third disc 220 shown in FIG. 6C.

Referring to FIG. 6A, the first disc 200 includes four electrically conductive regions 202A-202D, which are electrically isolated from one another by an electrically insulating region 204. In the embodiment of FIG. 6A, the electrically conductive regions 202A-202D have a segmented annular shapes, while the insulating region 204 has a circular shaped central region with radially extending extensions thereof. The electrically conductive regions 202A-202D may comprise graphite, for example. The insulating region 204 may comprise a non-conductive ceramic, such as an oxide (e.g., MgO).

Referring to FIG. 6B, the second disc 210 includes four electrically conductive regions 212A-212D similar to the regions 202A-202D of FIG. 6A. The second disc 210, however, also includes a central electrically conductive region 214, which is separated from the conductive regions 212A-212D by electrically insulating barriers 216. The central electrically conductive region 214 includes radially extending segments 218 that extend to an outer periphery of the second disc 210. The electrically conductive regions 212A-212D and 214 may comprise graphite, for example, and the insulating barriers 216 may comprise a non-conductive ceramic, such as an oxide (e.g., MgO).

The third disc 220 of FIG. 6C is generally similar to the second disc 210 of FIG. 6B, and includes four electrically conductive regions 222A-222D, and a central electrically conductive region 224, which is separated from the conductive regions 222A-222D by an electrically insulating barrier region 226. In the third disc 220, the central electrically conductive region 224 is circular in shape and concentrically surrounded by the barrier region 226, and does not include any radially extending segments (like the segments 218 of FIG. 6B). The electrically conductive regions 222A-222D and 224 may comprise graphite, for example, and the insulating barrier region 226 may comprise a non-conductive ceramic, such as an oxide (e.g., MgO).

Referring again to FIG. 5, in combination with FIGS. 6A-6C, in the first conductive disc structure 80A, the first disc 200 (FIG. 6A) may be disposed on the top side of the conductive disc structure 80A, the third disc 220 (FIG. 6C) may be disposed on the bottom side of the conductive disc structure 80A, and the second disc 210 (FIG. 6B) may be disposed in the middle between the first disc 200 and the third disc 220 (from the perspective of FIG. 5). In the second conductive disc structure 80B, the first disc 200 (FIG. 6A) may be disposed on the bottom side of the conductive disc structure 80B, the third disc 220 (FIG. 6C) may be disposed on the top side of the conductive disc structure 80B, and the second disc 210 (FIG. 6B) may be disposed in the middle between the first disc 200 and the third disc 220 (from the perspective of FIG. 5).

Thus, the central electrically conductive region 224 of the third disc 220 in the first conductive disc structure 80A is in physical and electrical contact with the first graphite plug 95A, and the central electrically conductive region 224 of the third disc 220 in the second conductive disc structure 80B is in physical and electrical contact with the second graphite plug 95B.

In this configuration, an electrical pathway for the FAST sintering current may be provided from the first electrically conductive metallic gasket 74A, into and through the central electrically conductive region 214 of the second disc 210 (FIG. 6B) of the first conductive disc structure 80B, into and through the central electrically conductive region 224 of the third disc 220 (FIG. 6C), into and through the first graphite plug 95A, through any canister 32 (FIG. 2) (and diamond particles therein) contained in the central cavity 96, into and through the second graphite plug 95B, into and through the central electrically conductive region 224 of the third disc 220 (FIG. 6C) in the second conductive disc structure 80B, into and through the central electrically conductive region 224 of the third disc 220 (FIG. 6C), and to the second electrically conductive metallic gasket 74B. Of course, current may be driven in the reverse direction through this conductive pathway for the FAST sintering process as well.

This conductive pathway for the FAST sintering process is electrically insulated from the conductive pathway for the HTHP sintering process heating. The conductive pathway for the HTHP sintering process heating may extend from the first punch 64A, through the first electrically conductive ring 86A, through the conductive regions 202A-202D of the first disc 200 (FIG. 6A) of the first conductive disc structure 80A, through the conductive regions 212A-212D of the second disc 210 (FIG. 6B), through the conductive regions 222A-222D of the third disc 220 (FIG. 6C), through the heater tube 78, through the conductive regions 222A-222D of the third disc 220 (FIG. 6C) of the second conductive disc structure 80B, through the conductive regions 212A-212D of the second disc 210 (FIG. 6B), through the conductive regions 202A-202D of the first disc 200 (FIG. 6A), through the second electrically conductive ring 86B, and into the second punch 64B. Of course, current may be driven in the reverse direction through this conductive pathway for the HTHP sintering process heating as well. It is to be appreciated that the conductive pathways of the cylindrical assembly 62 of the pressure cell 60, including the electrically conductive regions of the conductive disc structures 80A, 80B, may be configured to accommodate canisters 32 of varying size and shape disposed in the center cavity 96 while maintaining the conductive pathways necessary for operation of the pressure cell 60 according to the sintering processes disclosed herein. Moreover, a canister (not shown) may be sized and configured to fit two or more stacks of PDCs therein; thus, a canister so configured may include conductive pathways patterned in such a manner, and in register with the conductive pathways of the pressure cell 60, so as to provide a coaxial conductive pathway aligned with each stack of PDCs in the canister.

Figure 7:
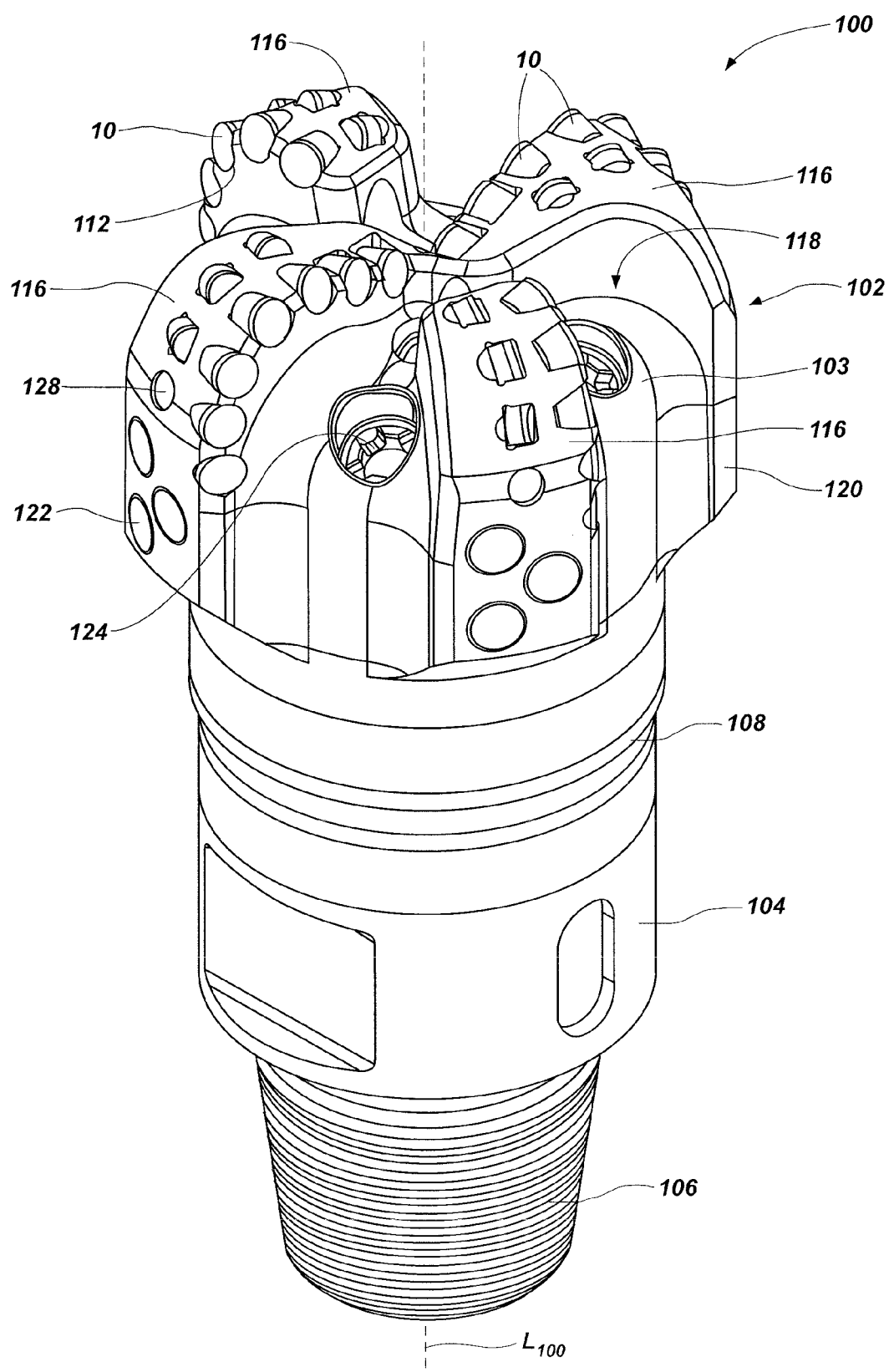
FIG. 7 is a perspective view of an embodiment of an earth-boring tool of the present disclosure that includes a plurality of cutting elements like those shown in FIGS. 1A and 1B.

Cutting elements that include polycrystalline diamond compacts formed as described herein may be used on earth-boring tools. FIG. 7 is a perspective view of an embodiment of an earth-boring tool according to the present disclosure. The earth-boring tool shown in FIG. 7 is a rotary drill bit 100 that includes a plurality of cutting elements 10 like that shown in FIGS. 1A and 1B. The earth-boring rotary drill bit 100 includes a bit body 102 that is secured to a shank 104 having a threaded connection portion 106 (e.g., an American Petroleum Institute (API) threaded connection portion) for attaching the drill bit 100 to a drill string (not shown). In some embodiments, such as that shown in FIG. 7, the bit body 102 may comprise a particle-matrix composite material (e.g., cemented tungsten carbide), and may be secured to the metal shank 104 using a metal blank embedded within the particle-matrix composite bit body 102.

The bit body 102 may include internal fluid passageways (not shown) that extend between the face 103 of the bit body 102 and a longitudinal bore (not shown), which extends through the shank 104, the metal blank, and partially through the bit body 102. Nozzle inserts 124 also may be provided at the face 103 of the bit body 102 within the internal fluid passageways. The bit body 102 may further include a plurality of blades 116 that are separated by junk slots 118. In some embodiments, the bit body 102 may include gage wear plugs 122 and wear knots 128. A plurality of cutting elements 10 as previously disclosed herein, may be mounted on the face 103 of the bit body 102 in cutting element pockets 112 that are located along each of the blades 116. The cutting elements 10 are positioned to cut a subterranean formation being drilled while the drill bit 100 is rotated under weight-on-bit (WOB) in a bore hole about centerline $L_{100}$.

Cutting elements formed in accordance with the methods disclosed herein also may be used as gauge trimmers, and may be used on other types of earth-boring tools. For example, cutting elements formed as described herein also may be used on cones of roller cone drill bits, on reamers, mills, bi-center bits, eccentric bits, coring bits, and so-called "hybrid bits" that include both fixed cutters and rolling cutters.

Although embodiments of the disclosure have been described herein with respect to the formation of polycrystalline diamond, the invention may also be used to form other polycrystalline materials. For example, embodiments of the methods described herein also may be used to form polycrystalline cubic boron nitride by employing particles of cubic boron nitride in place of diamond particles in the particle mixture subjected to the HPHT and FAST sintering processes.

Additional non-limiting example embodiments of the disclosure are set forth below.

Embodiment 1

A method of forming a polycrystalline diamond compact, comprising: forming a particle mixture including diamond particles and nanoparticles; and sintering the particle mixture to form polycrystalline diamond material including nanograins of diamond, sintering the particle mixture comprising: subjecting the particle mixture to a high temperature and high pressure sintering cycle; and pulsing direct electrical current through the particle mixture during at least a portion of the high temperature and high pressure sintering cycle.

Embodiment 2

The method of Embodiment 1, further comprising selecting the nanoparticles to comprise diamond nanoparticles.

Embodiment 3

The method of Embodiment 1 or Embodiment 2, further comprising selecting the nanoparticles to comprise nanoparticles of a non-diamond carbon allotrope.

Embodiment 4

The method of Embodiment 3, further comprising selecting the nanoparticles of a non-diamond carbon allotrope to comprise nanoparticles of at least one of carbon fullerenes, graphene, and carbon nanotubes.

Embodiment 5

The method of Embodiment 3 or Embodiment 4, wherein sintering the particle mixture to form polycrystalline diamond material comprises converting at least a portion of the nanoparticles of the non-diamond carbon allotrope into at least some of the nanograins of diamond.

Embodiment 6

The method of any one of Embodiments 1 through 5, wherein forming the particle mixture further comprises selecting the diamond particles to have an average particle size of at least about one micron.

Embodiment 7

The method of any one of Embodiments 1 through 6, wherein sintering the particle mixture to form polycrystalline diamond material including nanograins of diamond further comprises sintering the particle mixture to form polycrystalline diamond material including relatively larger grains of diamond formed from the diamond particles.

Embodiment 8

The method of any one of Embodiments 1 through 7, further comprising selecting the nanoparticles to comprise nanoparticles of a non-diamond carbon allotrope, and further comprising coating the diamond particles with the nanoparticles of the non-diamond carbon allotrope.

Embodiment 9

The method of any one of Embodiments 1 through 6, further comprising selecting the nanoparticles to comprise diamond nanoparticles and nanoparticles of a non-diamond carbon allotrope, and further comprising coating the diamond nanoparticles with the nanoparticles of the non-diamond carbon allotrope.

Embodiment 10

The method of Embodiment 1, wherein each of the diamond particles and the nanoparticles comprise diamond nanoparticles.

Embodiment 11

The method of Embodiment 10, wherein each of the diamond particles and the nanoparticles consist essentially of diamond nanoparticles.

Embodiment 12

The method of any one of Embodiments 1 through 11, wherein subjecting the particle mixture to a high temperature and high pressure sintering cycle further comprises subjecting the particle mixture to high temperature and high pressure conditions in the presence of a catalyst configured to catalyze the formation of diamond-to-diamond intergranular bonds in the polycrystalline diamond material.

Embodiment 13

The method of any one of Embodiments 1 through 12, wherein subjecting the particle mixture to high temperature and high pressure conditions comprises subjecting the particle mixture to a temperature of at least about 1,300° C. and a pressure of at least about 5.0 GPa.

Embodiment 14

The method of any one of Embodiments 1 through 12, wherein subjecting the particle mixture to high temperature and high pressure conditions comprises subjecting the particle mixture to a temperature of about 1,600° C. or less and a pressure of at least about 6.5 GPa.

Embodiment 15

The method of any one of Embodiments 1 through 14, wherein pulsing direct electrical current through the particle mixture comprises pulsing the direct current at amperage between about 200 amperes and about 2,000 amperes.

Embodiment 16

The method of Embodiment 15, wherein pulsing direct electrical current through the particle mixture comprises applying the direct current through the particle mixture for an average pulse time of between about 5 milliseconds to about 25 milliseconds with an average interval time between pulses of between about 0.5 millisecond to about 100 milliseconds.

Embodiment 17

A method of forming an earth-boring tool, comprising: forming a particle mixture including diamond particles and nanoparticles; sintering the particle mixture to form a polycrystalline diamond compact including nanograins of diamond, sintering the particle mixture comprising: subjecting the particle mixture to a high temperature and high pressure sintering cycle; and pulsing direct electrical current through the particle mixture during at least a portion of the high temperature and high pressure sintering cycle; and attaching the polycrystalline diamond compact to a body of an earth-boring tool.

Embodiment 18

The method of Embodiment 17, further comprising selecting the body of the earth-boring tool to comprise a bit body of an earth-boring rotary drill bit.

Embodiment 19

The method of Embodiment 17 or Embodiment 18, further comprising selecting the nanoparticles to comprise diamond nanoparticles.

Embodiment 20

The method of any one of Embodiments 17 through 19, further comprising selecting the nanoparticles to comprise nanoparticles of a non-diamond carbon allotrope.

Embodiment 21

The method of Embodiment 20, wherein sintering the particle mixture to form a polycrystalline diamond compact comprises converting at least a portion of the nanoparticles of the non-diamond carbon allotrope into at least some of the nanograins of diamond.

Embodiment 22

The method of any one of Embodiments 17 through 21, wherein forming the particle mixture further comprises selecting the diamond particles to have an average particle size of at least about one micron.

Embodiment 23

The method of any one of Embodiments 17 through 22, wherein sintering the particle mixture to form a polycrystalline diamond compact including nanograins of diamond further comprises sintering the particle mixture to form a polycrystalline diamond compact including relatively larger grains of diamond formed from the diamond particles.

Embodiment 24

The method of any one of Embodiments 17 through 23, further comprising selecting the nanoparticles to comprise nanoparticles of a non-diamond carbon allotrope, and further comprising coating the diamond particles with the nanoparticles of the non-diamond carbon allotrope.

Embodiment 25

The method of any one of Embodiments 17 through 24, further comprising selecting the nanoparticles to comprise diamond nanoparticles and nanoparticles of a non-diamond carbon allotrope, and further comprising coating the diamond nanoparticles with the nanoparticles of the non-diamond carbon allotrope.

Embodiment 26

The method of any one of Embodiments 17 through 25, wherein pulsing direct electrical current through the particle mixture comprises pulsing the direct current at amperage between about 200 amperes and about 2,000 amperes.

Embodiment 27

The method of Embodiment 26, wherein pulsing direct electrical current through the particle mixture comprises applying the direct current through the particle mixture for an average pulse time of between about 5 milliseconds to about 25 milliseconds with an average interval time between pulses of between about 0.5 millisecond to about 100 milliseconds.

Embodiment 28

A sintering system for sintering a particle mixture to form a polycrystalline diamond compact, comprising: a pressure cell; at least one device configured to increase a pressure within the pressure cell to at least about 5.0 GPa; at least one heating device configured to increase a temperature within the pressure cell to at least about 1,300° C.; and an electrically conductive pathway including a first segment extending to a first side of the pressure cell and a second segment extending to a second side of the pressure cell, the first segment and the second segment of the electrically conductive pathway configured to provide electrical current through a container and a particle mixture to be compacted within the pressure cell during a sintering cycle such that electrical current may be conducted through the particle mixture using the electrically conductive pathway during at least a portion of the sintering cycle.

Embodiment 29

The sintering system of Embodiment 28, wherein the at least one heating device comprises another electrically conductive pathway electrically isolated from the electrically conductive pathway including the first segment and the second segment.

Embodiment 30

The sintering system of Embodiment 29, wherein the another electrically conductive pathway extends through a resistive heating element.

Embodiment 31

The sintering system of any one of Embodiments 28 through 30, wherein the at least one device configured to increase a pressure within the pressure cell to at least about 5.0 GPa comprises at least one punch.

While the present invention has been described herein with respect to certain example embodiments, those of ordinary skill in the art will recognize and appreciate that it is not so limited. Rather, many additions, deletions, and modifications to the embodiments depicted and described herein may be made without departing from the scope of the invention as hereinafter claimed, and legal equivalents. In addition, features from one embodiment may be combined with features of another embodiment while still being encompassed within the scope of the invention as contemplated by the inventor.

What is claimed is:

1. A sintering system for sintering a particle mixture to form a polycrystalline diamond compact, comprising:
a pressure cell comprising a container configured to contain a particle mixture to be compacted within the pressure cell during a sintering cycle;
at least one device configured to increase a pressure within the pressure cell to at least 5.0 GPa;
at least one heating device external to the container and configured to increase a temperature within the pressure cell to at least 1,300° C.; and
an electrically conductive pathway including a first segment extending to a first side of the pressure cell and a second segment extending to a second side of the pressure cell, the first segment and the second segment of the electrically conductive pathway configured to provide electrical current through the container and the particle mixture such that electrical current is conducted through the particle mixture using the electrically conductive pathway during at least a portion of the sintering cycle, each of the first segment and the second segment of the electrically conductive pathway comprising:
a first disc having at least one electrically conductive region and at least one electrically insulating region; and
a second disc having a central electrically conductive region, at least one additional electrically conductive region, and at least one electrically insulating region separating the central electrically conductive region and the at least one additional electrically conductive region.

2. The sintering system of claim 1, wherein the at least one heating device comprises another electrically conductive pathway electrically isolated from the electrically conductive pathway including the first segment and the second segment.

3. The sintering system of claim 2, wherein the another electrically conductive pathway extends through a resistive heating element.

4. The sintering system of claim 1, wherein the at least one device configured to increase a pressure within the pressure cell to at least 5.0 GPa comprises at least one punch.

5. The sintering system of claim 1, wherein the pressure cell further comprises a hollow salt cylinder.

6. The sintering system of claim 1, wherein the electrically conductive pathway further comprises at least one electrically conductive graphite plug through the container.

7. The sintering system of claim 1, wherein the first disc comprises a plurality of electrically conductive regions separated from one another by the at least one electrically insulating region.

8. The sintering system of claim 1, wherein the at least one electrically conductive region comprises graphite, and wherein the at least one electrically insulating region comprises a ceramic.

9. The sintering system of claim 1, wherein each of the first segment and the second segment of the electrically conductive pathway further comprises a third disc having a central electrically conductive region, at least one additional electrically conductive region, and at least one electrically insulating region separating the central electrically conductive region and the at least one additional electrically conductive region.

10. The sintering system of claim 9, wherein the second disc is disposed between the first disc and the third disc.

11. A sintering system, comprising:
a generally cylindrical assembly between a pair of punches;

a belt member at least partially surrounding the generally cylindrical assembly;

a pair of insulating assemblies between the punches and the belt member, wherein each insulating assembly of the pair comprises an electrically conductive metallic gasket disposed between two thermally and electrically insulating members;

a heater tube disposed within the generally cylindrical assembly;

at least one container within the heater tube, the at least one container configured to contain a particle mixture during sintering;

a first segment of an electrically conductive pathway located adjacent to a first axial end of the heater tube, the first segment comprising a first plurality of discs, each of the first plurality of discs having at least one electrically conductive region and at least one electrically insulating region; and a second segment of the electrically conductive pathway located adjacent to a second axial end of the heater tube opposite the first axial end, the second segment comprising a second plurality of discs, the second plurality of discs having at least one electrically conductive region and at least one electrically insulating region;

wherein the first segment and the second segment of the electrically conductive pathway are configured to provide electrical current through the at least one container and the particle mixture to be compacted within the at least one container during a sintering cycle such that electrical current may be conducted through the particle mixture using the electrically conductive pathway during at least a portion of the sintering cycle.

12. The sintering system of claim 11, further comprising a pressure transmitting medium between the heater tube and the at least one container.

13. The sintering system of claim 12, wherein the pressure transmitting medium comprises a cylindrical salt liner.

14. The sintering system of claim 11, wherein the at least one container comprises an inner cup, a top end member, and a bottom end member, wherein the top end member and the bottom end member are configured to be swage bonded around the inner cup.

15. The sintering system of claim 11, further comprising an insulating barrier within the at least one container, wherein the insulating barrier defines at least one discontinuity through which electrical current may pass.

16. The sintering system of claim 11, further comprising at least one mica film within the at least one container, wherein the at least one mica film has a diameter smaller than an interior diameter of the at least one container.

17. The sintering system of claim 11, wherein the at least one container comprises a plurality of containers in electrical contact with one another.

18. The sintering system of claim 11, wherein each of the first plurality of discs and the second plurality of discs comprises:

a first disc having at least one electrically conductive region and at least one electrically insulating region;

a second disc having a central electrically conductive region, at least one additional electrically conductive region, and at least one electrically insulating region separating the central electrically conductive region and the at least one additional electrically conductive region; and a third disc having a central electrically conductive region, at least one additional electrically conductive region, and at least one electrically insulating region separating the central electrically conductive region and the at least one additional electrically conductive region.

19. The sintering system of claim 18, wherein the second disc is located between the first disc and the third disc and adjacent to the electrically conductive metallic gasket such that an electrical pathway is provided through the electrically conductive metallic gasket, the central electrically conductive region of the second disc, and the central electrically conductive region of the third disc.

20. The sintering system of claim 19, wherein an additional electrical pathway electrically insulated from the electrical pathway is provided through the at least one electrically conductive region of the first disc, the at least one additional electrically conductive region of the second disc, the at least one additional electrically conductive region of the third disc, and the heater tube disposed within the generally cylindrical assembly.

* * * * *